Oct. 13, 1942.   A. G. COOLEY   2,298,466
ELECTRO-OPTICAL SYSTEM AND APPARATUS
Filed July 18, 1940   2 Sheets-Sheet 1

Austin G. Cooley
INVENTOR
BY John J. Logan
ATTORNEY

Oct. 13, 1942.  A. G. COOLEY  2,298,466
ELECTRO-OPTICAL SYSTEM AND APPARATUS
Filed July 18, 1940  2 Sheets-Sheet 2

Austin G. Cooley
INVENTOR
BY John J. Logan
ATTORNEY

Patented Oct. 13, 1942

2,298,466

UNITED STATES PATENT OFFICE 2,298,466

ELECTRO-OPTICAL SYSTEM AND APPARATUS

Austin G. Cooley, New York, N. Y., assignor, by mesne assignments, to Times Telephoto Equipment Inc., New York, N. Y., a corporation of New York Application July 18, 1940, Serial No. 346,113

10 Claims. (Cl. 179—171.5)

This invention relates to electro-optical systems and more particularly to methods of converting light signals into a modulated carrier current signal.

A principal object is to provide a novel form of modulating arrangement suitable for use in tele-facsimile systems, television systems and electro-optical systems generally.

Another object is to provide a photo-electric cell translating system which has a maximum of sensitivity in responding to light signal variations.

Another object is to provide a novel method of employing a photo-electric cell or similar light sensitive device whereby the employment of the usual cell polarizing batteries or the like is obviated.

Heretofore, numerous circuit arrangements have been proposed for using a light sensitive device such as a photo cell as a light signal translator. In most of these prior arrangements, the inherent interelectrode electrostatic capacity or the inherent electrostatic capacity of the electrodes with respect to ground has been a drawback to the attainment of maximum sensitivity. It has therefore been proposed to overcome the undesirable effects of this inherent electrostatic capacity by connecting the photo-electric cell in Wheatstone bridge balancing network. An arrangement of this kind is described in Patent No. 1,688,292 to A. Weaver. I have found that by suitable circuit arrangements, it is possible to utilize the otherwise undesirable inherent electrostatic capacity of a photo-electric cell as the controlling factor in a translating circuit. In other words, a system such as disclosed in the said Weaver patent treats the inherent capacity as a disadvantage which is to be overcome or balanced out, while I have found that it is possible to utilize that capacity in a practical way.

Accordingly, a feature of the invention relates to a novel light signal translating arrangement utilizing the inherent electrostatic capacity variations of a photo-electric cell in response to light signals.

Another feature relates to a photo-electric cell translating arrangement wherein no D. C. polarizing potentials are necessary in operating the cell, and a carrier voltage is applied to the cell and limited in amplitude so that the cell operates substantially entirely as a variable capacitor as distinguished from a variable resistor.

A further feature relates to a novel form of photo-electric cell bridge modulating arrangement.

A further feature relates to a novel photoelectric cell modulating arrangement whereby either positive or negative modulations of a carrier wave can be easily effected.

Another feature relates to a novel form of photo-electric cell balancing arrangement.

A further feature relates to a novel form of photo-electric cell construction.

A still further feature relates to the novel organization, arrangement and relative location and interconnection of parts which constitute an improved light translating system.

Other features and advantages not specifically enumerated will be apparent after a consideration of the following detailed descriptions and the appended claims.

Referring to the drawings.

Figure 1:
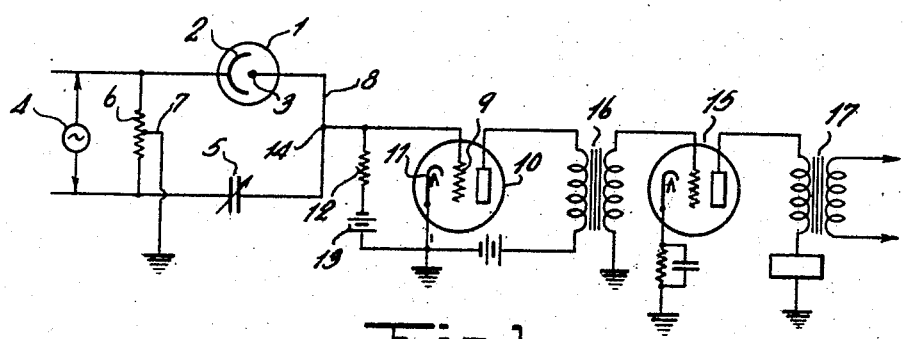
Fig. 1 is a schematic wiring diagram of a typical modulating system embodying features of the invention.

In accordance with the present invention, the voltages applied to the photo-electric cell or cells are purposely limited so that they take no part in rendering the cells conductive to D. C. In other words, none of the usual polarizing sources are required; and in fact I have found that even if a relatively low D. C. potential, e. g., 5 or 6 volts is applied to the cell, the polarity of the source with respect to the cell is immaterial. Consequently, wherever reference is made herein to a cathode of a photo-electric cell, is intended to mean the electrode upon which the light signals are projected and which forms clouds of electrons in response to such signals.

I have found that present day photo-electric cells, especially those of the high vacuum type, can be operated as substantially pure variable capacitors, as distinguished from resistors or conductance controls. However, in order to so operate such cells, I have found it necessary not only to avoid the usual relatively high voltage D. C. sources for polarizing the cell, but also to limit the voltage swing of the impressed carrier wave so that the cell does not become a variable conductor for D. C. between the electrodes. By this arrangement, it is possible to increase the light translating sensitivity of the cell and it is possible to use the cell in a balancing network such as a Wheatstone bridge arrangement employing relatively simple balancing arrangements.

In ordinary Wheatstone bridge balancing networks such as described for example in the said Weaver patent, the D. C. polarizing batteries employed on the cell cause the cell to be conductive and to act as a variable resistor when the carrier is impressed thereon. Consequently, when the cell is subjected to light variations, complex modulation products arise in the cell circuit. Furthermore, since the cell acts as a variable resistor, it is necessary to provide some means of balancing out the normal resistance of the cell, as well as means for balancing out its capacity with respect to ground. Furthermore, in such prior arrangements, a D. C. conductive path must be provided across the electrodes of the cell and for this reason relatively high polarizing voltages, as high as 90 volts in the case of gas cells are required. I have found that this D. C. path reduces the sensitivity of the cell and increases the difficulty of balancing the network into which the cell is connected. In accordance with the present invention, the cathode and anode of the photo-electric cell are substantially conductively isolated from each other, so far as D. C. is concerned, during the entire range of light signals to which the cell is exposed. While in its preferred form, the invention provides no D. C. circuit in series with the electrodes of the cell, nevertheless to a certain extent the cell can be operated with very small D. C. voltages applied thereacross so long as these voltages are not of sufficient magnitude to cause the cell to act as an equivalent variable resistor. Thus, I have found that voltages of about 5 or 6 volts may be impressed on the cell without appreciably introducing any variable resistor characteristics and yet the cell operates as a substantially pure capacitor.

Referring to Fig. 1, there is shown in schematic form, a light sensitive cell 1 of any well-known construction having the light sensitive electrode or cathode 2 which emits clouds of electrons when light impinges thereon; and a cooperating spaced anode 3 which is not light sensitive. The electrodes 2 and 3 are enclosed in a suitable highly evacuated glass bulb having a suitable light shield for restricting the entrance of light to the cathode 2 from the signalling light source. A source 4 of carrier current preferably in the form of a substantially sinusoidal audio frequency alternating current is connected across the electrodes 2 and 3 in series with an adjustable condenser 5. In accordance with the invention, the source 4 is adjusted so that its maximum voltage swing is well below the voltage necessary to render the space between electrodes 2 and 3 conductive as a D. C. path. Thus the source 4 may have its amplitude limited to a maximum of approximately two volts, which is insufficient to draw any substantial quantity of photo-electrons from electrode 2 to electrode 3 when the latter is energized by the positive half-waves.

Connected across source 4 is a potentiometer resistance 6, the mid-point 7 of which is grounded or connected to a suitable steady base potential which may be positive or negative with respect to ground. The conductor 8 connecting electrode 3 and condenser 5 is also connected to the control grid 9 of a suitable amplifier tube 10 whose cathode 11 is connected to the same base potential as that of the point 7. The control grid 9 is biased with respect to cathode 11 by the series resistor 12 and battery 13 which has its positive terminal connected to the cathode 11. Preferably, the battery 13 is of about 1 to 5 volts and is not materially higher in voltage than the maximum swing of the voltage source 4. I have found that when the voltage of source 4 is limited as above described, variations of light impinging on cathode 2 cause the cell 1 to act as a substantially pure variable capacitor. Consequently, if the point 7 is the electrical mid-point of resistor 6, and if capacity 5 is adjusted so that it is substantially the same as the capacity between electrodes 2 and 3 with the cell 1 dark, then the carrier voltage across points 7 and 14 is approximately zero. Consequently, there will be approximately zero carrier voltage impressed on grid 9. It will be understood of course that the point 7 may be adjustable along the resistor 6 to balance the network. When light shines on cathode 2, the apparent capacity between electrodes 2 and 3 increases, and unbalance of the bridge circuit occurs, resulting in a carrier voltage across points 7 and 14 and a corresponding voltage difference between grid 9 and cathode 11. This impressed voltage will therefore have the frequency of the source 4 but will have its amplitude modulated in accordance with the light signals impinging on cell 1. The modulated carrier signal is then amplified in the amplifier tube 9 and in one or more succeeding amplifier stages 15. While I am not prepared to give the exact reason why the light variations result in a change of apparent capacity in cell 1, one probable explanation is that since the D. C. voltage applied across electrodes 2 and 3 is purposely limited so that it is below that sufficient to draw any appreciable quantity of photo-electrons emitted from cathode 2 to anode 3, and since the applied carrier voltage from source 4 is likewise limited, the light impinging on cathode 2 results in photo-electron clouds or sheaths of varying thickness or depth adjacent cathode 2. Thus the cell 1 acts like a substantially pure variable capacity and can be readily balanced against the capacitor 5. I have found that the use of any substantial D. C. voltage across the electrodes of cell 1 such as the usual D. C. polarizing voltages which are ordinarily of the order of 20 to 90 volts, reduces the sensitivity of the cell when reliance is placed on its capacity variations for modulation purposes. If the ordinary polarizing potentials are applied across the cell and if care is not exercised to limit the voltage swing of the source 4, the cell would act mainly as a variable resistor in response to light variations, and the modulating components will then generally exceed the intensity of the applied carrier waves making it necessary to filter out, or balance out, such modulating components in order to prevent exaggerated outlines and "secondary" or "stutter" outlines where the system is used for picture transmission or similar purposes.

If in the arrangement of Fig. 1 a slight low frequency modulating component should appear on grid 9, this low frequency component can be reduced to a negligible factor by proper design of the coupling between amplifier stages 9 and

15. One method is to design the coupling transformers 16, 17, so that they are very inefficient at the lower modulating frequencies but have high efficiency at the carrier frequency of source 4, for example 1800 C. P. S.

The output of amplifier 15 can be applied to any suitable transmission channel whether of the wire or radio type, and if cell 1 is illuminated under control of any well-known type or facsimile scanner, the picture elements are translated into a modulated audio frequency carrier which can be received and translated back into a facsimile reproduction by any well-known facsimile receiving machine.

Figure 2:
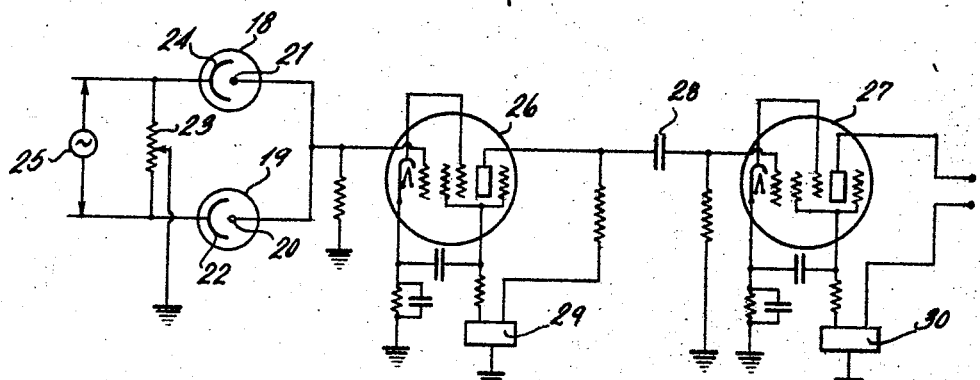
Fig. 2 is a modification of Fig. 1 employing two photo-electric cells.

Referring to Fig. 2, there is shown a modification wherein the main or modulating cell 18 which corresponds to cell 1 (Fig. 1) is balanced by a second similar cell 19 whose anode 20 is connected directly to anode 21 and whose cathode 22 is connected through potentiometer resistance 23 to cathode 24. If desired, a small amount of adjustable light from the same source which illuminates cell 18, or from a separate adjustable source, may shine on cathode 22 to adjust the capacity of cell 19 for balancing purposes. In Fig. 2 as in Fig. 1, no D. C. polarizing source is connected in the circuit of cells 18 and 19 and the applied carrier from source 25 is limited in amplitude so that the light signals impressed on cells 18 and 19 cause them to act as substantially pure capacitors which can be balanced readily against each other. The arrangement of Fig. 2 has the advantage over that of Fig. 1 in that if for any reason there is an unavoidable resistance leakage between electrodes 21 and 24, this can be readily balanced out by the corresponding resistance leakage of cell 19. Such resistance leakage cannot be balanced out with a device such as the condenser 5 (Fig. 1). In the embodiment of Fig. 2, the amplification of the modulated carrier is effected by pentode tube amplifiers 26, 27, which are coupled together by "resistance-condenser coupling" as shown. The coupling capacitor 28 is preferably chosen of such a low value that any undesired low frequency modulating components arising in the bridge are greatly attenuated while the carrier frequency of source 25 is amplified efficiently. Inasmuch as the connections for pentode tube amplifiers are well-known in the art, further description thereof is deemed unnecessary beyond stating that the rectangles 29 and 30, represent common or separate sources of high D. C. potential supply for the various electrodes of the pentodes.

Whereas in the embodiment of Fig. 2, the cells 18, 19, are shown as separate tubes, I have found, when using the system of Fig. 2, it is more efficient and practical to use two photo-electric cells contained in the same tube or envelope. A preferred embodiment of such a duplex cell is shown in Figs. 4 to 7, wherein the interior electrode arrangement may be the same as that of an RCA photocell type 920. The glass envelope or bulb 31 is highly evacuated and has sealed therein the usual reentrant stem or press 32 through which are sealed the various lead-in and support wires 33, 34, 35, 36. The bulb is provided with any well-known form of shell base 37 having the usual contact prongs 38, 39, 40, 41. Attached to the lead-in wires 34, 35 as by welding, are the light sensitive cathodes 42, 43, which are of metal having their concave surfaces processed or coated to render them electrically emissive when light shines thereon. Preferably, each of the cathodes is in the form of a cylindrical sector symmetrically spaced with relation to the central vertical axis of the tube mount. The rods 33 and 36 adjacent the press 32 are bent at right angles and are then extended vertically upwards and parallel to each other to constitute anodes 44, 45, located approximately along the axes of curvature of the associated cathodes 42, 43. In order to maintain the spaced relation at the upper ends of the electrodes, wires 46, 47, 48 and 49, extending from the respective electrodes are rigidly united and insulated from each other by a suitable glass bead 50. The wall of the bulb is enclosed in a light-proof housing or sheath 51 which may take the form of a coating of black wax, tar or the like, except that a portion of the bulb is left uncoated to form a window 52 through which the light beam enters. As will be seen from Fig. 7, the window extends from the point 53 to the point 54 or approximately one-fourth of the periphery of the bulb. The window is so arranged with respect to the electrode systems so that when the light is projected in the direction of the dotted arrow (Fig. 7), the entire width of cathode 42 is illuminated but only a small fraction of the light leaks by reflection or otherwise on to the cathode 43. In order to adjust more precisely the electrostatic balance between the two electrode systems of the duplex cell, there is provided a small heavy bridging wire or metal strap 55 which is soldered across the prongs 38 and 39 connected respectively with anodes 44, 45. Fastened to strap 55 is an L-shaped metal member which has a portion 57 (Fig. 5) extending parallel to the cathode prongs 40, 41. The member 56 is of sufficiently heavy metal stock so that by bending the leg 56 the leg 57 can be varied in position with respect to prongs 40, 41, thus varying the relative capacitance between the anodes and cathodes of the electrode systems.

In order to increase further the sensitivity of the duplex cell, a conductive member 58 can be fastened to the exterior of bulb 31 and electrically connected by wire 59 to the strap 55. As shown more clearly in Figs. 4 and 7, the member 58 is in the form of a fine wire in the shape of a rectangular loop which is fastened to the bulb by the light impervious wax coating above described. Preferably, although not necessarily, the member 58 has its horizontal sides adjacent the edges of the window 52 so as not to interfere with the light through the window. Preferably also, the member 58 extends from the point 53 (Fig. 7) to the point 60 so that it electrostatically overlaps both electrode systems.

Figure 3:
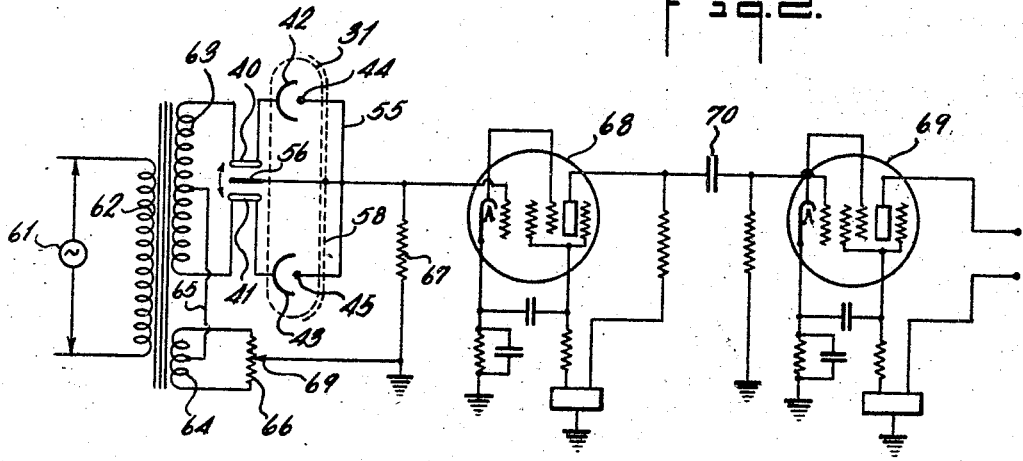
Fig. 3 is another modification of Fig. 1 employing a duplex photo tube.
Figure 4:
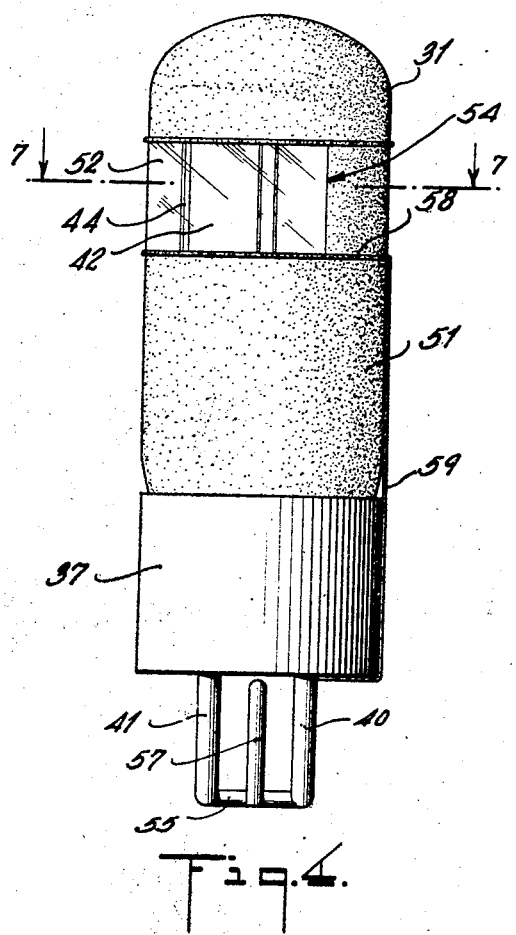
Fig. 4 is an elevational view of a duplex photoelectric tube according to the invention.
Figure 5:
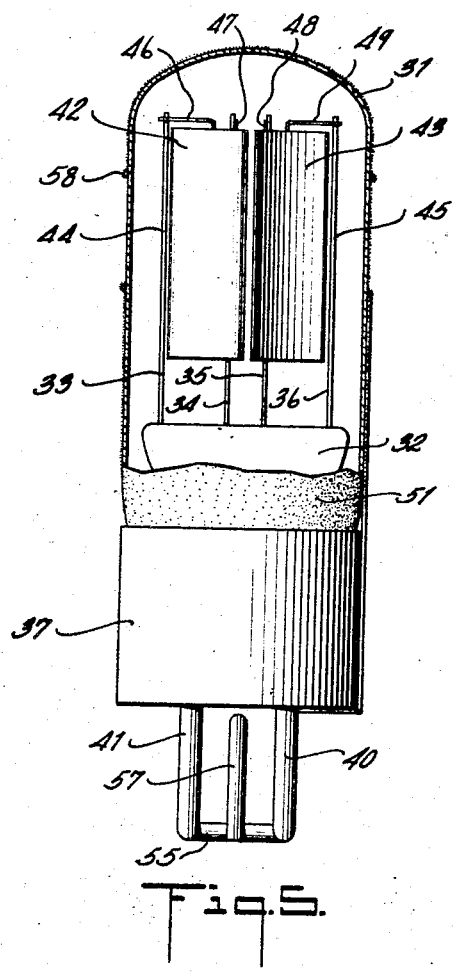
Fig. 5 is another view of Fig. 4 with part of the bulb broken away to show the interior construction.
Figure 6:
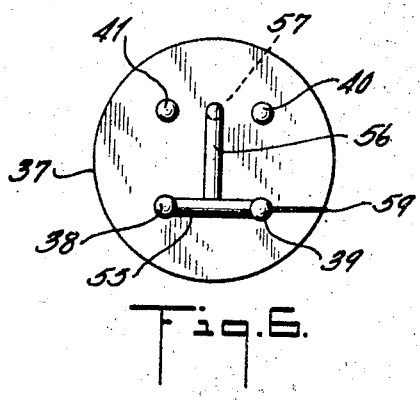
Fig. 6 is a bottom plan view of Fig. 4.
Figure 7:
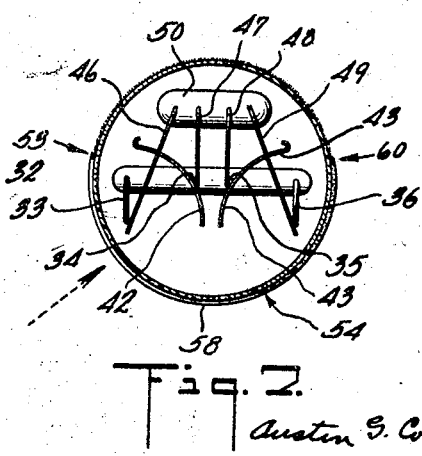
Fig. 7 is a sectional view through the bulb of Fig. 4 taken along the line 7—7 to show a topplan view of the electrode mount.

Referring to Fig. 3, there is shown a preferred form of circuit arrangement embodying the duplex cell of Figs. 4 to 7. The parts of the cell corresponding to those of Figs. 4 to 7 bear the same designation numerals. The source of audio frequency carrier current 61 which may be for example 1800 C. P. S., is connected to the primary 62 of a coupling transformer which has two secondary windings 63, 64. The electrical mid-points of the windings 63, 64 are connected together by the conductor 65. The ends of windings 63 are connected to contact prongs 40, 41, which in turn are connected to the respective cathodes 42, 43. The anodes 44, 45 are connected together by the strap 55, and this strap is connected to the adjustable member 56, which can be adjusted with respect to the prongs 40, 41 as indicated by the curved arrow and as described above in connection with Figs. 4 to 7. The supplementary metal member 58 is indicated schematically by the dotted line 58 in Fig. 3, and the envelope 31 is likewise indicated schematically by the dotted line 31.

The secondary winding 64 is connected to ground through the potentiometer resistance 66 and likewise the adjustable member 56 is connected to ground through the resistance 67. The purpose of the auxiliary transformer winding 64 is to enable a small amount of carrier signal to be applied to the amplifier tube 68 to represent the "shadow" signal. Thus, the "shadow" signal may be impressed on the amplifier without disturbing the electrostatic capacity balance between the two sections of the duplex cell 31 or without appreciably changing the applied voltage to the cells. The winding 64 has a very small number of turns compared with the winding 63 and the phase and amplitude of the "shadow" signal applied to tube 68 can be controlled by the potentiometer 66. If the contact arm 69 of this potentiometer is on one side of the center of resistance 66, positive modulation is obtained in the carrier for the complete range of shade values to be transmitted. On the other hand, if the arm 69 is on the other side of the center of resistance 66, negative modulation of the carrier is obtained for the range of shade values to be transmitted. Thus, the displacement of arm 69 from the center of resistance 66 controls the amount of initial signal or "shadow" signal corresponding to positive modulation or it controls the amount of initial signal or high light signal corresponding to negative modulation. The tube 68 may be a pentode amplifier tube which feeds another similar pentode amplifier tube 69 through the usual resistance-condenser coupling. The coupling condenser 70 is made very small in order to attenuate greatly any undesired modulating components in the carrier but the amplifier as a whole is designed to pass and amplify efficiently the carrier frequency from source 61.

Normally, the duplex cell is balanced corresponding to "shadow" signals or corresponding to high-light signals. Ordinarily, since the duplex cell is provided with identical electrode systems, the interelectrode capacities between the respective cathodes and anodes will be substantially the same. However, if one cell happens to be slightly different from the other, it can be balanced by allowing an appropriate amount of leakage light to shine on the cathode 43. However, if this method of balancing is not desired, the member 56 may be adjusted towards or away from the prong 41 to vary the relative capacities of the two sections of the cell for balancing. It will be understood of course that in achieving this initial balance, the source 61 may be disconnected and the member 56 moved to adjust the relative capacities between the two cells, the balance or predetermined ratio of the capacities is being determined by a suitable indicator device (not shown) and the output of the amplifier 68 or the amplifier 69.

Various changes and modifications may be made without departing from the spirit and scope of the invention.

This application is a continuation-in-part of application Serial No. 273,162, filed May 12, 1939, Patent No. 2,212,808, August 27, 1940.

What I claim is:

1. A modulating system comprising a Wheatstone bridge, a variable arm of which is constituted of a photo-electric cell responsive to light signals, a source of a carrier voltage connected to said bridge, said cell being free from any D. C. polarizing potentials of sufficient magnitude to draw a substantial quantity of photo-electrons from the cathode to the anode, an amplifier tube connected to said bridge, and means to apply to said tube a small amount of unmodulated carrier voltage independently of the adjustment of said bridge.

2. A modulating system comprising a pair of similar photo-electric cells, a source of carrier voltage, a Wheatstone bridge circuit arrangement interconnecting said cells, said cells being substantially free from D. C. polarizing potentials, means to adjust the relative inherent electrostatic capacitances of said cells to balance the bridge, an amplifier tube connected to the bridge and controlled by the unbalance thereof, and means to apply to said tube a small quantity of unmodulated carrier without disturbing the balance of said bridge.

3. A modulating system comprising a duplex photo-electric cell, a source of carrier voltage, a transformer connected to said source and having its secondary winding connected with said duplex cell to form a Wheatstone bridge, means to adjust the inherent electrostatic capacitance of the sections of said cell to balance the bridge, an amplifier tube connected to said bridge to be controlled by the unbalance current thereof, and another secondary winding for said transformer connected to said tube to apply a predetermined small amount of unmodulated carrier without disturbing the balance of said bridge.

4. A modulating system according to claim 3 in which means is provided to adjust the relative phase and amplitude of said unmodulated carrier with respect to the unbalance current of the bridge.

5. A modulating system comprising a pair of transformer windings each energized from a common source of audio frequency carrier voltage, means interconnecting the electrical midpoints of said windings, a first photo-electric cathode and its cooperating anode, a second photo-electric cathode and its cooperating anode, means interconnecting said cathodes and anodes with one of said transformer windings to form a Wheatstone bridge, an amplifier tube connected to said bridge and controlled by the unbalance current thereof, and a potentiometer connected across the other of said transformer windings the variable arm of said potentiometer being connected to said tube to apply a predetermined amount of unmodulated carrier to the tube without disturbing the adjustment of said bridge.

6. The method of modulating a carrier voltage in accordance with light signals and employing only the photo-capacitance variations of a photo-electric cell which includes the steps of applying the carrier voltage to the cell, balancing out the inherent electrostatic capacity of the cell to represent a given light condition, limiting the maximum amplitude of said carrier voltage as applied to said cell to a value where only the photo-capacitance of the cell varies while substantially eliminating any uni-lateral conductivity of said cell, and simultaneously illuminating the cell by light signals to produce in the output of the cell a correspondingly modulated carrier.

7. The method according to claim 6 in which the maximum voltage applied to the cell does not exceed 5 or 6 volts.

8. The method according to claim 6 in which the carrier amplitude is limited so that it is of the order of 2 volts maximum.

9. The method according to claim 6 in which a small D. C. voltage is also applied to the cell, the amplitude of the D. C. voltage and the carrier voltage being sufficiently low so that no substantial quantity of photo-electrons pass between the electrodes of the cell.

10. The method of modulating a carrier voltage in accordance with light signals and employing only the photo-capacitance variations of a photo-electric cell which includes the steps of applying the carrier voltage to the cell, balancing out the inherent electrostatic capacity of the cell to represent a given light condition, and limiting the maximum amplitude of the carrier voltage applied to the cell so that said cell symmetrically responds to the positive and negative half waves of the carrier when the cell is illuminated by light signals and is substantially entirely free from asymmetric conductivity normally tending to result from the positive half waves of the carrier above said amplitude.

AUSTIN G. COOLEY.